July 30, 1957 V. C. WESTCOTT ET AL 2,800,796
PRESSURE MEASURING DEVICE
Filed Aug. 5, 1952 3 Sheets-Sheet 1
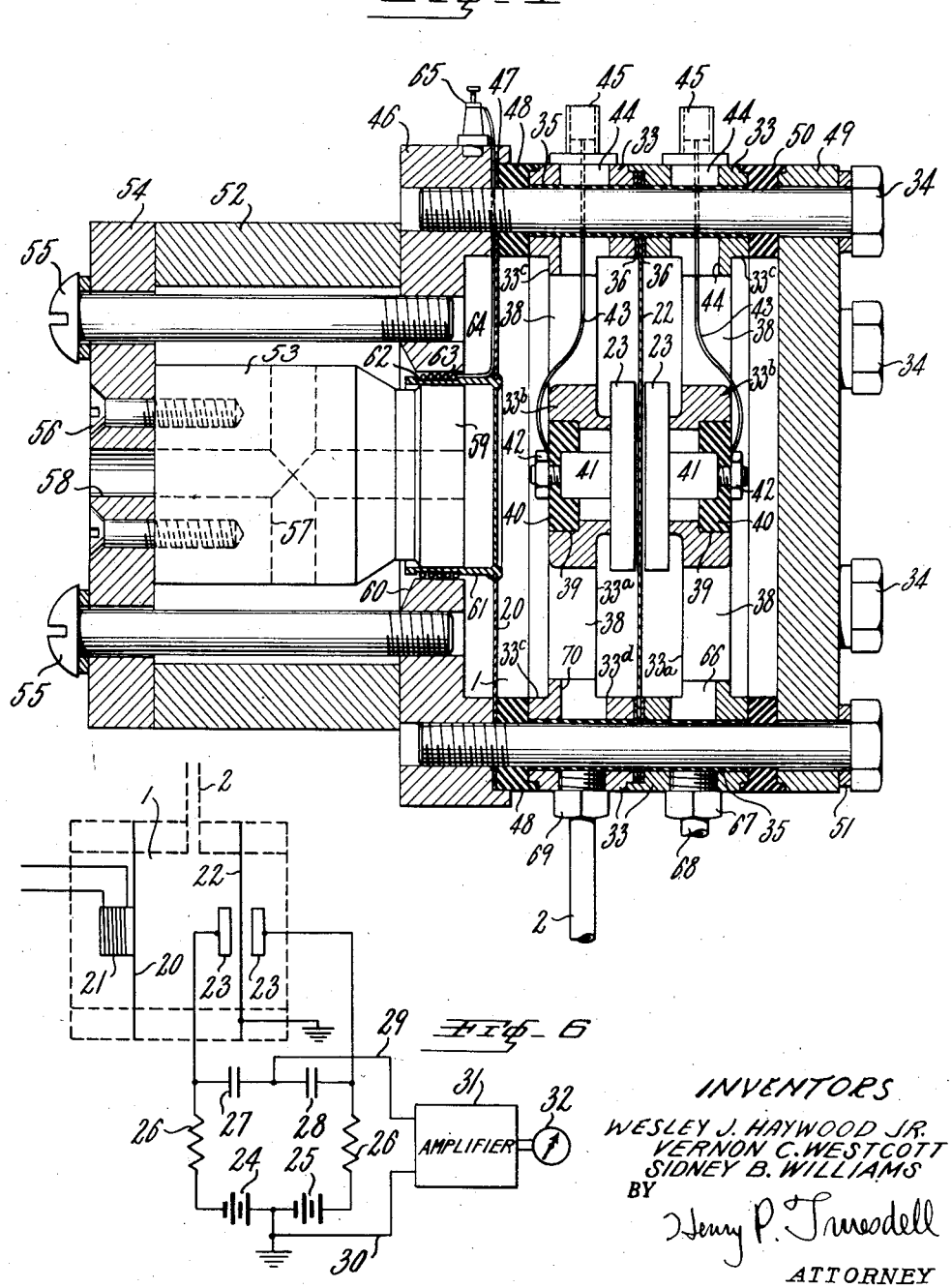
INVENTORS
WESLEY J. HAYWOOD JR.
VERNON C. WESTCOTT
SIDNEY B. WILLIAMS
BY
Henry P. Truesdell
ATTORNEY July 30, 1957  V. C. WESTCOTT ET AL  2,800,796
PRESSURE MEASURING DEVICE
Filed Aug. 5, 1952  3 Sheets-Sheet 2
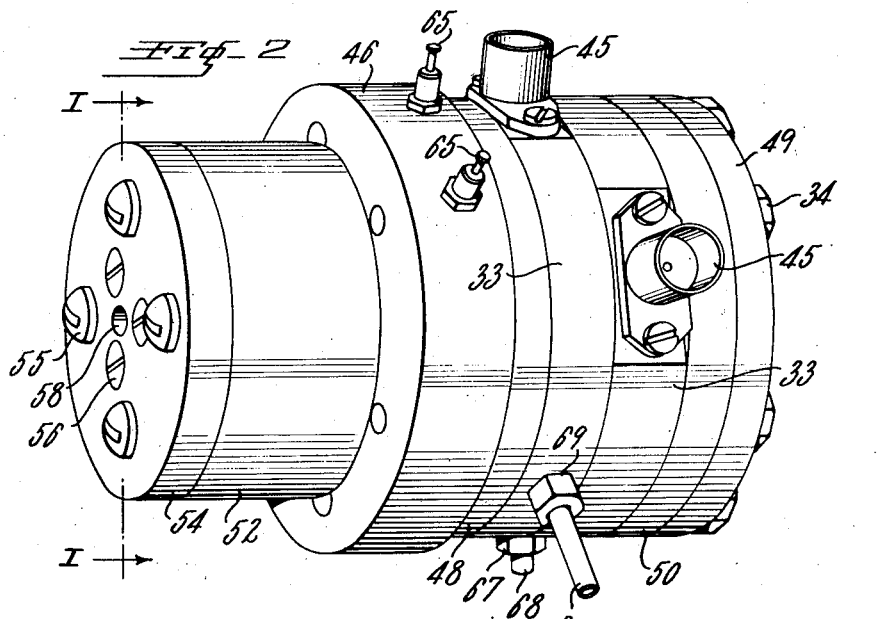
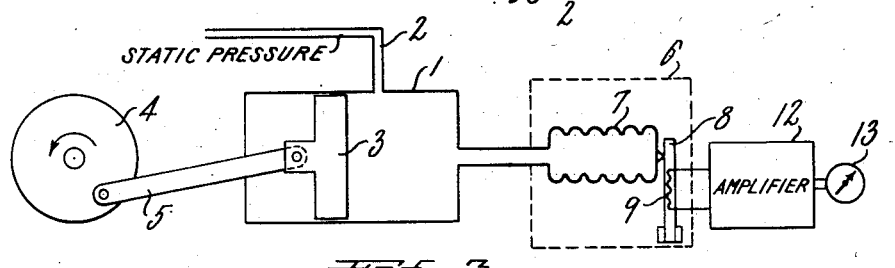
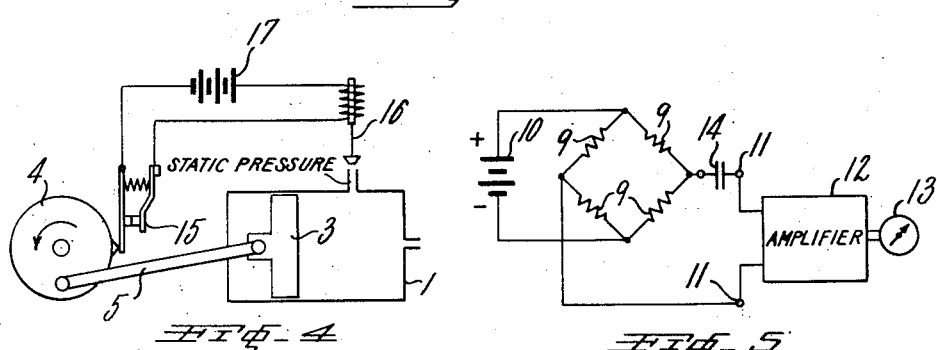
INVENTORS
WESLEY J. HAYWOOD JR.
VERNON C. WESTCOTT
SIDNEY B. WILLIAMS
BY
Henry P. Truesdell
ATTORNEY

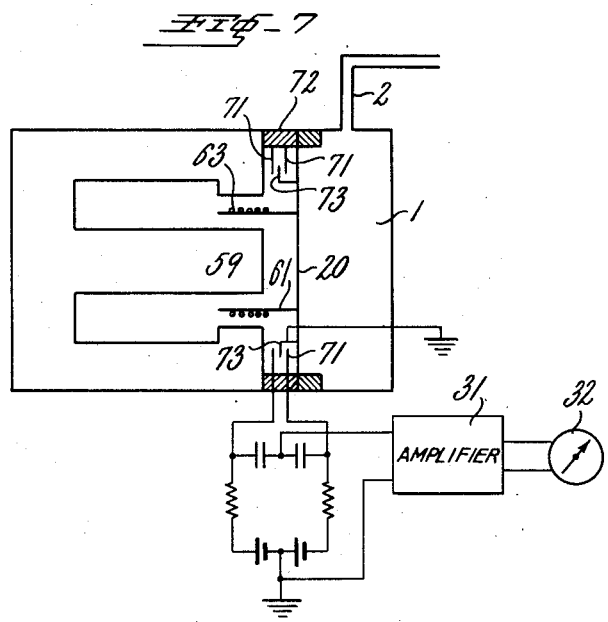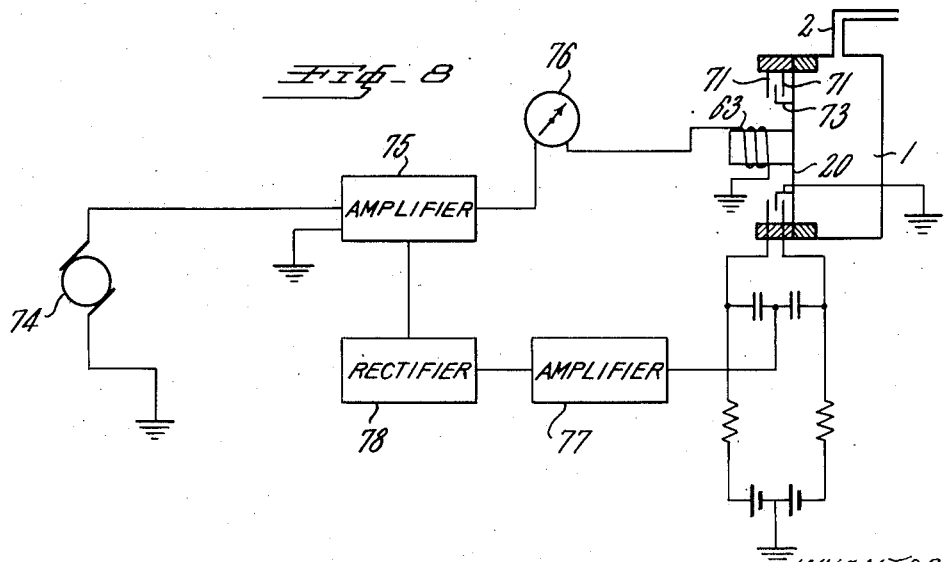

United States Patent Office 2,800,796
Patented July 30, 1957

2,800,796
PRESSURE MEASURING DEVICE

Vernon C. Westcott, Lincoln, Sidney B. Williams, Lexington, and Wesley J. Haywood, Jr., Concord, Mass., assignors to Trans-Sonics, Inc., Bedford, Mass., a corporation of Massachusetts Application August 5, 1952, Serial No. 302,694

4 Claims. (Cl. 73—398)

This invention relates to a pressure gauge, and to methods of measuring gas pressures, which are capable of measuring pressures from several atmospheres to very low pressures, on the order of fractions of a millimeter of mercury. The device may be considered to be a combined pressure and vacuum gauge since pressures of fraction of a millimeter of mercury are ordinarily referred to as a vacuum. Throughout the specification when the device is referred to as a pressure gauge it should be understood that one of its principal uses is in measuring vacuum or very low pressures.

In existing pressure gauges, of the Bourdon tube, diaphragm bellows, or liquid manometer types, the energy to operate the gauge mechanism is derived from the source of pressure. As a result, such gauges become inaccurate at or near zero pressure because sufficient energy is not available to move the linkages and parts of the indicating mechanism; in the case of manometers the energy to lift the liquid or mercury must come from the pressure source. Such errors become very great at low pressures near zero because the errors due to friction and mechanical inertia are a very large percentage of the pressure being measured. In addition, thermal expansion and contraction of the gauge mechanism under variations in temperature can introduce zero errors.

These disadvantages are overcome by the gauge of the instant invention in that a separate source of energy or power is utilized to operate the gauge. The method used employs a cavity which is filled with gas and the pressure of the gas within the cavity is maintained as a function of the static pressure of the gas being measured. The volume of the cavity is then changed periodically or cyclically by means of a separate power drive and a pressure pick-up is used to sense the cyclical pressure variations within the cavity. The amount of the instantaneous or cyclical increase in pressure within the cavity will depend upon the static pressure of the gas within the cavity. By measuring continuously the cyclical pressure variations, an indication is obtained which is a function of the static gas pressure within the cavity and which can be made to read directly in terms of the static pressure within the cavity; this corresponds to the pressure of the gas being measured. If there is no gas pressure within the cavity, there will be no pressure variations to be sensed so that the gauge is accurate linearly down to zero pressures and at such zero pressure gives a zero reading.

Therefore, it is an object of the present invention to provide a new and improved pressure gauge which is capable of measuring extremely low pressures with great accuracy.

It is another object of the invention to provide a pressure gauge in which a separate source of energy is utilized to operate the gauge rather than the pressure or energy of the gas being measured.

A further object of the invention is the provision of an improved pressure measuring device which is accurate throughout its entire range of operation, which is not subject to errors due to vibration, changes in temperature or mechanical shock, and which is free of any lagging or hysteresis effect.

In the accompanying drawings,

Fig. 1 is a sectional view through a preferred form of the pressure gauge taken substantially along the line I—I of Fig. 2 and showing the internal construction of the gauge;

Fig. 2 is a side view in elevation of the pressure gauge;

Fig. 3 is a schematic view showing another form of pressure gauge illustrating the principles of operation;

Fig. 4 is a modified form of the gauge of Fig. 3;

Fig. 5 shows the electrical output circuit for the gauge constructions of Figs. 3 and 4;

Fig. 6 is a schematic view of the gauge of Fig. 1 illustrating the principles of operation and showing one suitable form of electrical indicating circuit;

Fig. 7 is a schematic view of still another form of pressure gauge; and

Fig. 8 illustrates another form of control circuit for the gauge construction of Fig. 7.

Referring to the drawing, Fig. 3 illustrates one suitable form of pressure gauge mehcanism which is shown in schematic form to illustrate the principles of operation of the gauge. A cavity 1, constructed in any suitable form, is connected by means of a tube 2 with the source of outside or static gas pressure being measured so that the pressure of the gas within the cavity 1 is the same as the static pressure. A piston 3 is driven back and forth within the cavity 1 by any suitable driving mechanism, such as the motor 4 and pivoted arm 5. The piston alternately compresses the gas within the cavity 1 and the pressure changes within the cavity by an amount:

$$\Delta P = K P_s \Delta V$$

where K is a constant, $P_s$ is the static pressure, $\Delta V$ is the change in volume of the cylinder, and $\Delta P$ is the cyclical or periodic pressure of the compressed gas within the cylinders. The cyclical pressure $\Delta P$ is a linear function of the static pressure $P_s$ and will vary according to the static pressure of the gas within the cavity 1. If there is no static pressure within the cavity there can be no cyclical or instantaneous pressure $\Delta P$ which means that the gauge gives a zero reading at zero gas pressure.

The cyclical or periodic pressure of the gas within the cavity 1 is applied to a conventional pressure pick-up 6 of a type which gives an electrical indication in accordance with variations in the pressure. One suitable form of pressure pick-up includes a bellows 7 expanded by the pressure pulses to deform a cantilever beam 8 to which a plurality of electrical strain resistance filaments 9 are attached so that flexure of the beam varies the resistance of the wire filaments. As shown by Fig. 5, the electrical resistance filaments 9 are connected into a Wheatstone bridge circuit which is energized by a battery 10. Since the resistances of the strain filaments 9 vary in accordance with the pressure pulses received from the cavity the electrical output of the circuit of Fig. 4 will be varied to give an alternating current output across the terminals 11. The output voltages may be fed to an amplifier 12 and thence to any suitable indicator or recorder 13. A blocking condenser 14 prevents the D. C. excitation from reaching the terminals 11. The gas is compressed within the cavity on the order of from 3 to 5 cycles per second. Inasmuch as the cavity is continuously subject to the static gas pressures through the tube 2, any variations in the static pressure will be made manifest immediately in corresponding variations in the cyclical pressure to change the electrical output of the gauge. In this way the gauge provides a continuous reading of variations in the static pressure of the gas being measured.

Variations in the static pressure are followed positively, continuously and almost instantaneously.

The cavity 1 is made small compared to the lengths of the pressure waves generated by the piston. Accordingly, the vent tube 2 can be so designed in diameter and length to have an impedance such as to effectively block any leakage of the pressure wave outside the cavity while at the same time permitting the static pressure of the gas to be applied to the cavity. However, if desired, the cavity may be sealed off from the outside static pressure except for brief intervals when a sample of the gas is introduced into the cavity. Such an arrangement is shown by Fig. 4 wherein a normally open electric switch 15 is closed each revolution of the motor 4 to open a normally closed solenoid valve 16 through an electrical circuit including a battery 17.

In the form of the invention disclosed in Figs. 3 and 4, a considerable amount of power is required to change the volume of the cavity from 20 to 30% at the 3 to 5 cycles per second frequency. This requires larger motor sizes and larger gauge constructions than would be desirable, for example, for instrumentation on an airplane. A preferred form of the gauge, shown by Figs. 1, 2 and 6, makes possible a much more compact and light weight construction and is designed to operate with cyclical pressures at close to acoustical frequencies. The frequency chosen is 400 cycles per second, which corresponds to the frequency of the alternating current power source in an airplane, although manifestly other frequencies can be used. A high frequency operation of the gauge has the advantage that the power to compress the gas within the cavity is smaller because the magnitude of the compression required is smaller. Moreover, the response time of the instrument is much shorter.

Referring to Fig. 6, a stiff, flat diaphragm 20 forms one wall of the cavity 1 and is driven by an electro-dynamic motor including the coil 21. The diaphragm has a constant displacement within the cavity to change the volume by approximately one tenth of one percent (0.1%). As already noted, the cavity 1 is connected at all times to the source of static pressure being measured by the tube 2. The cyclical or instantaneous changes in pressure within the cavity 1 vibrate a second diaphragm 22 the amplitude of vibration being dependent upon the static pressure within the cavity. The diaphragm 22 is located between opposed electrode plates 23. A D. C. voltage from batteries 24 and 25, is applied across the parallel plates 23 through load resistors 26. In accordance with the amplitude of vibration of the diaphragm 22 the capacitance between the diaphragm and each of the electrode plates varies oppositely so that as the capacitance to one plate increases that to the other decreases. The result is that the electrode plates' instantaneous voltage decreases on the one electrode and increases on the other. Since D. C. voltage of opposite polarity is applied to each electrode plate, the alternating voltage variations on each electrode will be in the same direction and the electrode plates may be connected together by means of the capacitors 27 and 28. The variations in voltage unbalance the bridge circuits through the resistors, capacitors and batteries so that a voltage appears across the center tapped conductors 29 and 30. This A. C. voltage, the voltage of which varies in accordance with the amplitude of vibration of diaphragm 22, may be fed to an amplifier 31 and thence to any conventional recorder or indicator 32. Although the capacitance microphone pick-off circuit, illustrated by Fig. 6, is preferred because it has a very low noise ratio compared to the output voltage, it should be manifest that other types of acousto-electrical transducers may be used for converting the vibrations or cyclical pressure movements of the diaphragm 22 into corresponding electrical voltages.

Figs. 1 and 2 show a pressure gauge constructed in accordance with the principles of operation illustrated in Fig. 6. To form part of the cavity 1 two supporting members 33 are assembled in nested relationship on a plurality of bolts 34 which extend at spaced intervals around the outer circumferences of the members. A sleeve 35 of insulating material, such as a phenolic tube, is disposed over each of the bolts 34 and serves to insulate each of the supporting members from the bolts 34. The pick-up diaphragm 22, which is made of stiff metal, is clamped between the two supporting members 33 and is held in adjusted position between the parallel electrode plates 23 by means of adjusting shims 36. It should be manifest that the diaphragm 22 and the shims 36 are each provided with openings in their outer circumferences to receive the clamping bolts 34 and the insulating sleeves 35.

Each of the supporting members 33 is made in the form of a disc which has a web portion $33^a$ carrying a supporting hub $33^b$. The disc has recesses $33^c$ and $33^d$ on opposite sides of the central web which form, in effect, part of the cavity 1 between the diaphragms. The web is provided with a plurality of openings 38 which extend at spaced intervals around the hub $33^b$ to permit air or gas to flow freely to opposite sides of the disc. The hub portion $33^b$ is provided with a recess 39 into which is fitted an insulating bushing 40 which, in turn, carries a supporting stud 41 forming part of the parallel plate 23. Each of the plates 23 is insulated in any conventional way from the supporting hub $33^b$, although it is preferred to apply an insulating coating to the surface of the plate by an anodizing process. A nut 42 is threaded onto the stud 41 to clamp the plate 23 and the insulating bushing 40 in position on the hub $33^b$. In this way an exceptionally strong and rigid assembly is provided for the parallel plates 23 which means that they can be accurately located with respect to the diaphragm 22 and held in such position irrespective of any vibration or shocks to which the pressure gauge may be subjected. Electrical connections are made to the plates 23 by means of conductors 43 which extend through openings 44 in the supporting members 33 to conventional electrical connectors 45 mounted on the outer circumferences of the members.

In order to mount the diaphragm 20 in position the bolts 34 are threaded into a magnet face ring 46 and the diaphragm is clamped in a recess 47 in the ring between the ring and an insulating ring 48 which separates the magnet face ring 46 and the supporting member 33. The heads of the bolts 34 bear against a clamping disc 49 which seals off the interior of the gauge. The clamping disc is insulated from the adjacent supporting member 33 by means of a second insulator ring 50. The insulating rings 48 and 50 are formed of any suitable material such as a phenolic condensation product. Lock washers 51 on the bolts 34 assure permanent air-tight assembly of the gauge structure against vibration and shock. It will be apparent that as the bolts 34 are tightened into the magnet face ring 46, that the assembly of parts comprising the supporting members 33, the diaphragms 20 and 22, and the insulating rings 48 and 50 will be clamped tightly together to form an airtight chamber part of which is set off as the pressure cavity 1 by the diaphragms 20 and 22.

The driving means for the diaphragm 20 includes a permanent magnet 52 having a core 53 and a supporting plate 54 the assembly being held in position against the magnet face ring 46 by means of bolts 55 threaded into the ring and bearing against the supporting plate 54. The core 53 of the magnet is mounted on the supporting plate 54 by means of tapped screws 56 and the core is provided with a plurality of vent openings 57 communicating with a vent 58 in the supporting plate. Such vent openings insure that the outer face of the diaphragm 20 is subjected to the pressure of the air or gas being measured. The inner end 59 of the magnet core 53 is circular in form and extends into a circular opening or recess 60 formed in the magnet face ring 46. A hollow supporting sleeve 61 is fastened to the diaphragm 20 and extends into the recess 60 over the inner face 59 of the magnet core so that it is placed directly in the field of the magnet. The sleeve is formed with a recess 62 in which is wound a driver coil 63. Alternating current is fed to coil 63 by lead wires 64 which extend along the outer face of the diaphragm 20 and through a slot (not shown) in the magnet face ring 46 to outer terminals 65. Alternating current flowing through the driver coil 63 within the field of the permanent magnet 52 causes the sleeve 61 and diaphragm 20 to move or vibrate in synchronism with the pulsations of the alternating current.

In order to vent the remainder of the interior of the gauge and the outer wall of the diaphragm 22 to the pressure of the air or gas being measured, the right hand supporting member 33, as viewed in Fig. 1, is formed with an opening 66 into which a nipple 67 is threaded carrying a vent tube 68.

The tube 2, by means of which the pressure of the gas to be measured is introduced into the cavity 1, is carried by a nipple 69 threaded into an opening 70 in the other supporting member 33. The frequency of the cyclical pressures occurring at 400 cycles per second is such that the vent tube 2 acts as an impedance and holds the pressure waves within the cavity. The velocity of sound, which corresponds to the speed of the pressure waves within the cavity, is so great compared to the dimensions of the gauge cavity that the cyclical pressure is the same throughout the cavity and there are no pressure or standing waves formed. The length of the vent tubes 2 and 68 are made approximately equal to ¼ wave length of the pressure waves. Since the speed of sound is equal to approximately 1100 feet per second, and the frequency of vibration of the diaphragm 20 is 400 cycles per second, the wave length of the pressure pulses within the cavity may be determined by the equation $$\frac{1100}{400} = 2.8 \text{ feet}$$

the length of the vent tube 2 can be made approximately ¼ × 2.8 feet = 0.7 foot. The effect is that the cavity 1 is effectively closed off at 400 cycles per second while still being able to follow variations in the static pressure being measured.

The pressure gauge of Fig. 1 operates in accordance with the principles of operation described in connection with the schematic diagram of Fig. 6. 400 cycle current applied to the drive coil 63 moves the diaphragm 20 to vary cyclically the pressure within the cavity 10. The pressure pulses vibrate the diaphragm 22 to change the capacitance of the plates 23 of the capacitance pick-up. The amplitude of movement, or the degree of vibration, of the diaphragm 22 is dependent upon the static pressure of the gas within the cavity 1 and hence an electrical voltage is obtained proportional to the pressure of the gas being measured.

The actuating diaphragm 20 is deliberately made stiff so that its motion is due to the energy derived from the driving coil 63 and its movement will not be influenced by the ambient gas pressure. The change in volume within the cavity 1, attained by movement of the diaphragm, is on the order of 1/10 of 1% and the contraction and expansion of the gas adiabatic or isothermal. The cyclical rate of vibration of the diaphragm 20 is high enough so that the heat transfer effects in the body of the gauge from the expansion and contraction of the gas can be neglected. The dimensions of the cavity 1 are so small compared to the wave length of sound, or the wave length of the pressure pulses at 400 cycles per second, that there is no resonance phenomenon or standing waves within the cavity.

One of the advantages of the pressure gauge is that the energy used to drive the mechanism is supplied continuously from an outside source and the operation of the gauge is not dependent upon the energy or pressure of the gas source. This means that at low pressures the gauge is very fast and accurate in response. If the pressure of the gas being measured is zero the output of the gauge will be zero since there is no gas within the cavity 10 to transmit the pulses or vibrations of the diaphragm 20 to the diaphragm 22. This means that the pressure gauge has an absolute zero which gives an accurate reference point.

Another advantage of the gauge construction is that it is free of hysteresis which means that there will be no lag or retarding or inaccuracy in pressure readings as the gauge is subjected to increasing and then decreasing pressures. This is due to the fact that there is little if any hysteresis effect in the diaphragms 20 and 22 and none in the gas in the cavity. Whatever small hysteresis does occur does not result in difference in readings as between rising and falling pressures and makes possible a resolution, or difference in reading, of only 1 to 3 feet when the gauge is used at altitudes of 70,000 feet corresponding to extremely low pressures.

The pressure gauge is inherently insensitive to vibrations and shock. The pick-up mechanism including the diaphragm 22 is designed to be excited at a frequency of 400 cycles per second and any vibrations at such frequency to which the gauge may be subjected may be readily filtered out.

Although the gauge construction illustrated by Figs. 1, 2 and 6 makes use of both a driving and driven diaphragm, the gauge may be constructed with a cavity having a single diaphragm, as illustrated in schematic form by Fig. 7. The diaphragm 29 is supported within the cavity 1 and is vibrated by an electro-dynamic drive means including the coil 63 mounted on sleeve 61 within the field of the permanent magnet 59, the arrangement being similar to that shown by Fig. 1. The capacitance pick-off circuit includes two annular rings 71 which are mounted in spaced relationship on an insulating supporting ring 72 in the cavity. The diaphragm 29 carries a ring 73 which extends into the space between rings 71 to vary the capacitances between the ring 73 and the annular rings 71. The electrical circuit for energizing the rings 71 and operating the amplifier 31 and indicator 32 is the same as that illustrated by Fig. 6 and the operation of the circuit is the same.

The drive coil 63 is supplied with constant 400 cycle A. C. current to vibrate the diaphragm 29 and the amplitude of vibration of the diaphragm varies the capacitance effect between the rings 71 and 73 to vary the voltage output of the capacitance pick-off. As the absolute pressure of the air or gas within the cavity increases or decreases the amplitude of movement of the diaphragm will decrease or increase in a corresponding manner. This means that the amplitude of motion of the diaphragm, and consequently the voltage output applied to the amplifier and indicator, will be an inverse function of the absolute pressure within the cavity. For example, if the pressure increases the amplitude and voltage output will decrease. It will be understood that the diaphragm is vented on the side opposite the cavity so that no alternating pressure builds up on that side. Moreover, in the gauge of Fig. 7, the diaphragm 20 is constructed of light sheet metal with a low spring constant so that its amplitude of vibration is sensitive to variations in pressure within the cavity.

Another method of utilizing the vibrations of a single diaphragm to measure the gas pressure is shown by Fig. 8. The arrangement of the diaphragm, cavity, and capacitance pick-off circuit is the same as that shown by Fig. 7. However, the 400 cycle A. C. power from the source 74 is amplified in a conventional amplifier 75 having voltage gain control and is then fed to the drive coil 63 through an indicator 76 which measures the power applied to the drive coil. As the diaphragm vibrates, the change in amplitude effected by change in pressure will vary the voltage obtained from the capacitance pick-off circuit as the ring 73 varies the capacitance between itself and the rings 71. This voltage is fed to an amplifier 77, the amplified voltage is then rectified in the conventional rectifier 78 and the rectified D. C. control signal fed to the amplifier 75 to increase or decrease its output. The amplifiers 75 and 77 are adjusted to supply power to the coil 63 so that the diaphragm is caused to vibrate at a predetermined constant amplitude. As the pressure within the cavity decreases, for example, the amplitude of vibration of the diaphragm will tend to increase. However, such increase in amplitude will cause a corresponding change in the signal voltage obtained from the capacitance pick-up which will be fed through amplifier 77 and rectifier 78 to amplifier 75 to reduce the power output thereof to restore the amplitude of vibration of the diaphragm to its normal condition. The corresponding reduction in power, as shown by the indicator 76, will give an indication of the reduction of pressure within the cavity. In this way, the amount of power fed to the diaphragm drive coil to vibrate the diaphragm at constant amplitude is a measure of the gas pressure within the cavity.

Having thus described our invention, what we claim and desire to protect by Letters Patent is:

1. In a gas pressure measuring device, a plurality of hollow supporting discs, spaced diaphragms assembled between the discs and forming therewith a cavity, means for placing the cavity into communication with the gas, a magnet carried by one of said discs, an electrical driver coil carried by one of said diaphragms and being operable within the field of the magnet upon energization of the coil to vibrate the diaphragm to vary cyclically the pressure of the gas within the cavity, spaced electrode plates carried by others of said discs and being located on opposite sides of the second diaphragm, and means for applying a voltage across the spaced plates, said second diaphragm being vibrated in accordance with the cyclical variations in pressure of the gas within the cavity to vary the voltage across the plates.

2. In a gas pressure measuring device, a hollow supporting disc, a face plate having an opening therein, a diaphragm supported between the plate and disc, a magnet carried by said face plate and having a core extending into the opening in said plate, a sleeve carried by said diaphragm and extending into said opening around the core, a coil mounted on said sleeve and being operable within the field of the magnet upon electrical energization of said coil to vibrate the diaphragm, a second diaphragm, a second supporting disc for supporting the second diaphragm between the two discs in spaced relationship with the first diaphragm, the walls of the discs and diaphragms forming a cavity, means for placing the cavity into communication with the gas, vibration of the first diaphragm cyclically varying the pressure of the gas within the cavity to vibrate the second diaphragm, and means actuated by movement of the second diaphragm for indicating the pressure of the gas.

3. In a gas pressure measuring device, a hollow supporting disc, a face plate having an opening therein, a diaphragm supported between the plate and disc, a magnet carried by said face plate and having a core extending into the opening of said plate, a sleeve carried by said diaphragm and extending into said opening around the core, a coil mounted on said sleeve and being operable within the field of the magnet upon electrical energization of said coil to vibrate the diaphragm, a second diaphragm, a second supporting disc for supporting the second diaphragm between the two discs in spaced relationship to the first diaphragm, the walls of the discs and diaphragms forming a cavity, means for placing the cavity into communication with the gas, spaced electrode plates carried by said discs on opposite sides of the second diaphragm, and means for applying a voltage across the electrode plates, vibration of the first diaphragm cyclically varying the pressure of the gas within the cavity to vibrate the second diaphragm so that movement of the second diaphragm varies the voltage across the electrode plates.

4. In a gas pressure measuring device, two supporting members each having a recess and a hub portion, a diaphragm supported by and clamped between the members, an insulating bushing mounted on each hub portion, an electrode plate carried by each of the bushings, said plates being mounted in spaced relationship on opposite sides of said diaphragm to form in effect an electrical condenser the electrical characteristics of which are varied in accordance with vibrations of the diaphragm, a second diaphragm mounted on one of the supporting members and forming with the recess and the first mentioned diaphragm a cavity, means for connecting the cavity to the gas pressure, and power means for vibrating the second mentioned diaphragm to vary cyclically the pressure of the gas within the cavity to operate the first-mentioned diaphragm.

References Cited in the file of this patent

UNITED STATES PATENTS

| | | |
|---|---|---|
| 2,178,471 | De Bruin | Oct. 31, 1939 |
| 2,392,581 | De Juhasz | Jan. 8, 1946 |
| 2,521,634 | Janssen et al. | Sept. 5, 1950 |
| 2,594,138 | Elam | Apr. 22, 1952 |
| 2,712,239 | Havens | July 5, 1955 |
| 2,713,796 | Herndon | July 26, 1955 |

FOREIGN PATENTS

| | | |
|---|---|---|
| 278,316 | Germany | Dec. 12, 1913 |
| 574,819 | Great Britain | Jan. 22, 1946 |
| 825,177 | Germany | Dec. 17, 1951 |

OTHER REFERENCES

Article, Review of Scientific Instruments, vol. 21, No. 7, 1950, pp. 596–598, by Havens et al.